United States Patent
Shafin et al.

(10) Patent No.: US 12,356,440 B2
(45) Date of Patent: Jul. 8, 2025

(54) FAIRNESS FOR RESTRICTED TWT OPERATION

(71) Applicant: Samsung Electronics Co., Ltd., Suwon-si (KR)

(72) Inventors: Rubayet Shafin, Allen, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 457 days.

(21) Appl. No.: 17/661,259

(22) Filed: Apr. 28, 2022

(65) Prior Publication Data

US 2022/0361194 A1    Nov. 10, 2022

Related U.S. Application Data

(60) Provisional application No. 63/186,632, filed on May 10, 2021, provisional application No. 63/189,309, (Continued)

(51) Int. Cl.
| | |
|---|---|
| *H04W 72/12* | (2023.01) |
| *H04W 52/02* | (2009.01) |
| *H04W 72/21* | (2023.01) |
| *H04W 72/50* | (2023.01) |
| *H04W 72/543* | (2023.01) |
| *H04W 84/12* | (2009.01) |

(52) U.S. Cl.
CPC ..... *H04W 72/535* (2023.01); *H04W 52/0216* (2013.01); *H04W 72/21* (2023.01); *H04W 72/543* (2023.01); *H04W 84/12* (2013.01)

(58) Field of Classification Search
CPC ......... H04W 72/1257; H04W 72/1236; H04W 72/1284; H04W 52/0216; H04W 84/12;
(Continued)

(56) References Cited

U.S. PATENT DOCUMENTS

| | | | |
|---|---|---|---|
| 2008/0056221 A1* | 3/2008 | Xu | ............................. 370/342 |
| 2015/0189592 A1* | 7/2015 | Jafarian et al. | ... H04W 52/0216 |

(Continued)

FOREIGN PATENT DOCUMENTS

| | | | | |
|---|---|---|---|---|
| WO | WO 2014182252 A1 * | 11/2014 | ............ | H04W 84/12 |
| WO | WO 2017052429 A1 * | 3/2017 | ............ | H04W 28/08 |
| WO | WO 2020013874 A  * | 1/2020 | ............ | H04W 72/12 |

OTHER PUBLICATIONS

KR 20220011723 A) >>> Power Saving And Group Addressed Frames In WLAN Using Multiple Communication Links (see title) (Year: 2022).*

(Continued)

*Primary Examiner* — Meless N Zewdu

(57) ABSTRACT

Embodiments of the present disclosure provide methods and apparatuses for balancing a tradeoff between channel utilization and fairness during restricted target wake time (TWT) operation in a wireless network. The apparatuses include a wireless station (STA) device comprising a transceiver and a processor operably coupled to the transceiver. The transceiver is configured to transmit latency-sensitive uplink traffic and receive latency-sensitive downlink traffic in a restricted TWT service period (SP) during restricted TWT operation, and to receive, from an access point (AP), an indication that the restricted TWT SP is terminated early based on a lack of latency-sensitive uplink traffic for transmission by the STA and a lack of latency-sensitive downlink traffic for reception by the STA in a remainder of the restricted TWT SP. The processor is configured to terminate operation of the restricted TWT SP by the STA.

20 Claims, 9 Drawing Sheets

Related U.S. Application Data filed on May 17, 2021, provisional application No. 63/323,378, filed on Mar. 24, 2022.

(58) Field of Classification Search
CPC . H04W 72/535; H04W 72/21; H04W 72/569; H04W 72/543; H04W 28/0278; H04W 28/02; H04W 72/566; H04W 52/02; H04W 72/50; H04W 72/512; H04W 72/52; H04W 28/0917; H04W 28/0221; H04W 52/00; H04W 52/0235; H04W 52/0283; H04W 52/0219; H04W 52/0261; H04W 72/04; H04W 72/12; H04W 76/27; H04W 76/28; H04W 88/02; H04W 88/08; H04W 88/00; H04W 74/00; H04W 74/02; H04W 74/04; H04W 72/232; H04W 72/231; H04W 72/23; H04W 72/1263; H04W 72/1268; H04W 72/1273; H04W 72/20; H04W 72/02; H04W 52/0203; H04W 52/0206; H04W 52/0209; H04W 52/14; H04W 48/00; H04W 48/02; H04W 48/06; H04W 48/16; Y02D 30/70; H02J 9/005; G06F 1/3212

See application file for complete search history.

(56) References Cited

U.S. PATENT DOCUMENTS

| | | | |
|---|---|---|---|
| 2016/0219522 A1* | 7/2016 | Asterjadhi et al. | H04W 52/0235 |
| 2016/0295579 A1* | 10/2016 | Pham et al. | H04W 72/0446 |
| 2018/0192372 A1* | 7/2018 | Park et al. | H04W 52/0229 |
| 2019/0053155 A1* | 2/2019 | Kneckt et al. | H04W 52/02 |
| 2019/0075521 A1 | 3/2019 | Kneckt et al. | |
| 2019/0253967 A1* | 8/2019 | Xiao et al. | H04W 52/0216 |
| 2019/0253968 A1 | 8/2019 | Xiao et al. | |
| 2021/0022154 A1 | 1/2021 | Cavalcanti et al. | |
| 2021/0037464 A1 | 2/2021 | Cariou et al. | |

OTHER PUBLICATIONS (WO 2022077241 A1) >>> Multi-Connection Communication Method and Apparatus, Device, and Storage Medium (see title) (Year: 2022).*

(WO 2020013874 A1), Apparatus for scheduling time sensitive networking wireless communications, comprises a logic and circuitry for causing wireless communication access point to allocate a time sensitive networking enabled target wakeup time service period (Year: 2020).*

EEE P802.11be-D0.4 "Part 11: Wireless LAN Medium Access Control (MAC) and Physical Layer (PHY) Specifications—Amendment 8: Enhancements for extremely high throughput (EHT)" Mar. 2021, 511 pgs.

Ming Gan, et al.; IEEE 802.11-19/1988-03-00be; "Power Save for Multi-link"; Nov. 11, 2019; 15 pgs.

1 Extended European Search Report issued Apr. 2, 2024 regarding Application No. 22807709.5, 9 pages.

International Search Report and Written Opinion issued Aug. 12, 2022 regarding International Application No. PCT/KR2022/006374, 7 pages.

Hu et al., "Restricted TWT Spec Text Resolving TBDs: Part I", IEEE P802.11 Wireless LANs, IEEE 802.11-21/0462r2, Apr. 2021, 8 pages.

* cited by examiner

FAIRNESS FOR RESTRICTED TWT OPERATION

CROSS-REFERENCE TO RELATED APPLICATION(S) AND CLAIM OF PRIORITY

This application claims priority under 35 U.S.C. § 119(e) to U.S. Provisional Patent Application No. 63/186,632 filed on May 10, 2021; U.S. Provisional Patent Application No. 63/189,309 filed on May 17, 2021; and U.S. Provisional Patent Application No. 63/323,378 filed on Mar. 24, 2022, which are hereby incorporated by reference in their entirety.

TECHNICAL FIELD

This disclosure relates generally to power management in wireless communications systems. Embodiments of this disclosure relate to methods and apparatuses for balancing a tradeoff between channel utilization and fairness during restricted target wake time operation for communications in a wireless local area network communications system.

BACKGROUND

With the standardization process of the next generation IEEE 802.11 wireless local area network (WLAN), i.e., IEEE 802.11ax amendment entering the final stage, the IEEE 802.11ax amendment is drawing attention of the information technology (IT) industry. It newly introduces features for improving peak throughput and efficiency in an environment crowded by many 802.11 devices. Example environments include airports, stadiums, and so on. Wi-Fi alliance (WFA) has already launched the WI-FI 6 certification program for guaranteeing interoperability between certified products implementing IEEE 802.11ax amendment. In the market, device manufacturers are already starting to release WI-FI 6 certified smart mobile devices.

Target Wake Time (TWT) is one of the important features of the IEEE 802.11ax amendment. TWT enables wake time negotiation between an access point (AP) and an associated station (STA) for improving power efficiency. With TWT operation, it suffices for a STA to only wake up at pre-scheduled time negotiated with another STA or AP in the network. In IEEE 802.11ax standards, two types of TWT operation are possible—individual TWT operation and broadcast TWT operation. Individual TWT agreements can be established between two STAs or between a STA and an AP. On the other hand, with broadcast TWT operation, an AP can set up a shared TWT session for a group of STAs.

The negotiated parameters such as the wake interval, wake duration and initial wake time (offset) highly affect latency, throughput as well as power efficiency, which are directly related to QoS (quality of service) or customer experiences. Services with different traffic characteristics will have different TWT parameter configurations for better QoS. Additionally, the TWT configuration should adapt to network and service status variation.

Restricted TWT (rTWT) operation, which is based on broadcast TWT operation, is a feature introduced with a view to providing better support for latency sensitive applications. Restricted TWT offers a protected service period for its member STAs by sending Quiet elements to other STAs in the basic service set (BSS) which are not members of the restricted TWT schedule, where the Quiet interval corresponding to the Quiet element overlaps with the initial portion of the restricted TWT SP. Hence, it gives more channel access opportunity for the restricted TWT member scheduled STAs, which helps latency-sensitive traffic flow.

SUMMARY

Embodiments of the present disclosure provide methods and apparatuses for balancing a tradeoff between channel utilization and fairness during restricted TWT operation in a wireless network (e.g., a WLAN).

In one embodiment, a STA device is provided, comprising a transceiver and a processor operably coupled to the transceiver. The transceiver is configured to transmit latency-sensitive uplink traffic and receive latency-sensitive downlink traffic in a restricted TWT service period (SP) during restricted TWT operation, and to receive, from an access point (AP), an indication that the restricted TWT SP is terminated early based on a lack of latency-sensitive uplink traffic for transmission by the STA and a lack of latency-sensitive downlink traffic for reception by the STA in a remainder of the restricted TWT SP. The processor is configured to terminate operation of the restricted TWT SP by the STA.

In another embodiment, an AP device is provided, comprising a transceiver and a processor operably coupled to the transceiver. The transceiver is configured to transmit latency-sensitive downlink traffic and receive latency-sensitive uplink traffic in a restricted TWT SP during restricted TWT operation, and to transmit, to a STA, an indication that the restricted TWT SP is terminated early based on a lack of latency-sensitive uplink traffic for transmission by the STA and a lack of latency-sensitive downlink traffic for reception by the STA in a remainder of the restricted TWT SP. The processor is configured to terminate operation of the restricted TWT SP with respect to the STA.

In another embodiment, a method of early termination of a restricted TWT SP during restricted TWT operation by a wireless STA device is provided, including the steps of receiving, from an access point (AP), an indication that the restricted TWT SP is terminated early based on a lack of latency-sensitive uplink traffic for transmission by the STA and a lack of latency-sensitive downlink traffic for reception by the STA in a remainder of the restricted TWT SP, and terminating operation of the restricted TWT SP by the STA.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The following documents and standards descriptions are hereby incorporated into the present disclosure as if fully set forth herein:

[1] IEEE 802.11-19/1988r3, "Power Save for Multi-link", June 2020.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that during restricted TWT operation, if a STA is done with transmitting latency-sensitive packets in the uplink (UL) before the end of the restricted TWT service period (SP) and there is no packet waiting for that STA in the downlink (DL) for the remainder of the SP, then it causes channel under-utilization for that STA, assuming the STA is prohibited from transmitting latency-tolerant traffic for the remainder of the SP.

Embodiments of the present disclosure also recognize that channel under-utilization due to an under-utilized restricted TWT SP can be reduced by allowing latency-tolerant traffic in addition to latency-sensitive traffic for transmission during restricted TWT SPs. For example, once the scheduled STA is done transmitting latency-sensitive traffic during a restricted TWT SP, and if there is still time remaining in the SP, if the scheduled STA can choose to transmit its latency-tolerant packets (if any) during the remainder of the SP, this will improve the channel utilization for the STA.

However, embodiments of the present disclosure recognize that this will create a fairness issue with respect to other scheduled STAs. Regarding contention among the scheduled STAs, if one scheduled STA starts transmitting latency-tolerant traffic during the restricted TWT SP, it is not fair for other scheduled STAs that are still transmitting latency-sensitive traffic during the SP.

Furthermore, embodiments of the present disclosure recognize that a STA with malicious intentions may abuse this functionality by setting up TWT parameters such that there is always additional time left in the restricted TWT SP after transmitting latency-sensitive packets. The malicious STA could then take advantage of this additional time to transmit latency-tolerant traffic with the benefit of the protection provided by restricted TWT operation. Therefore, a trade-off exists between channel utilization and fairness.

Accordingly, embodiments of the present disclosure provide apparatuses and methods that balance the tradeoff between channel utilization and fairness during restricted TWT SP. Various of these embodiments include the early termination of the restricted TWT SP for a STA.

Figure 1:
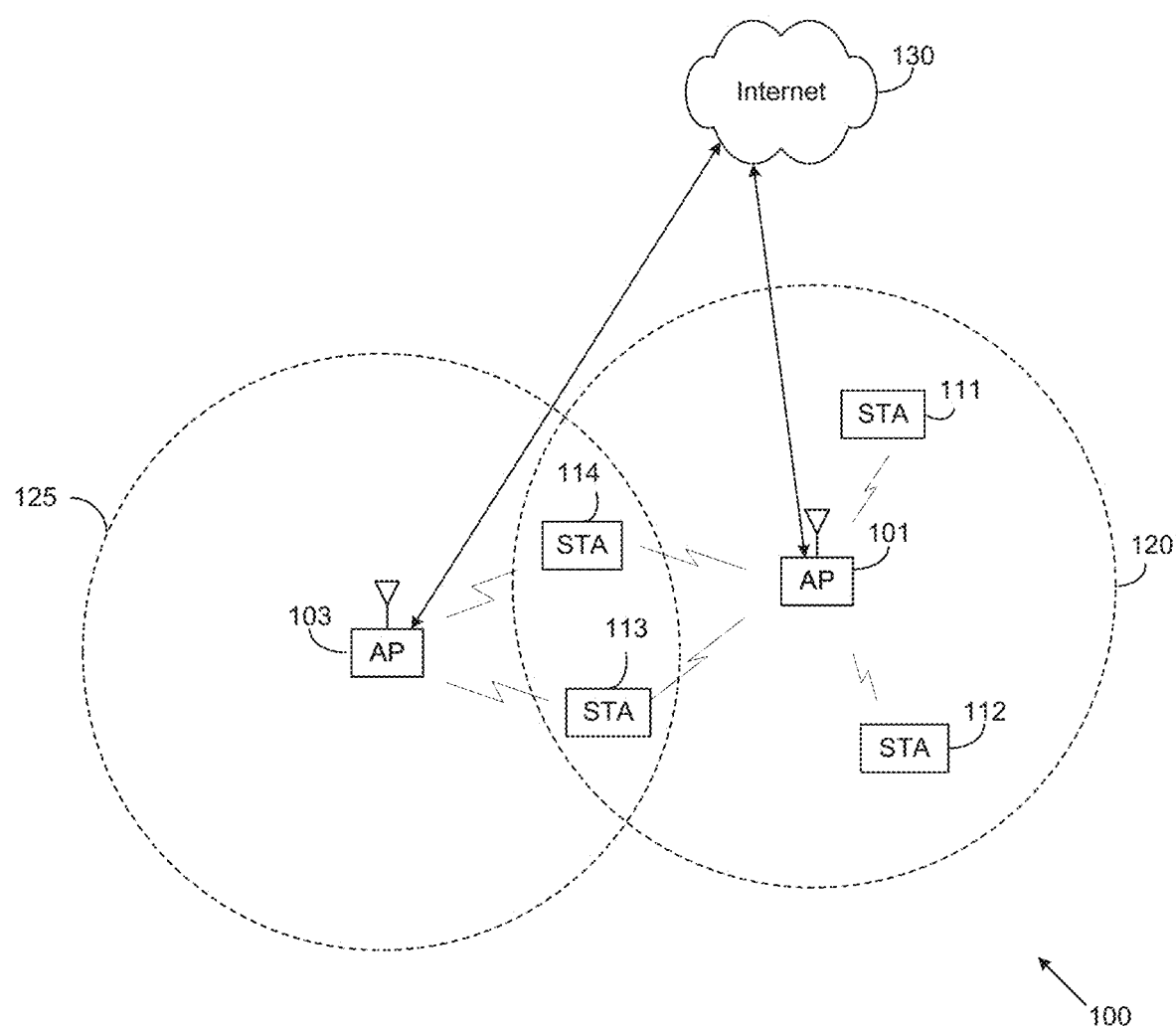
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using WI-FI or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for processing a request for traffic characteristics in a WLAN. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
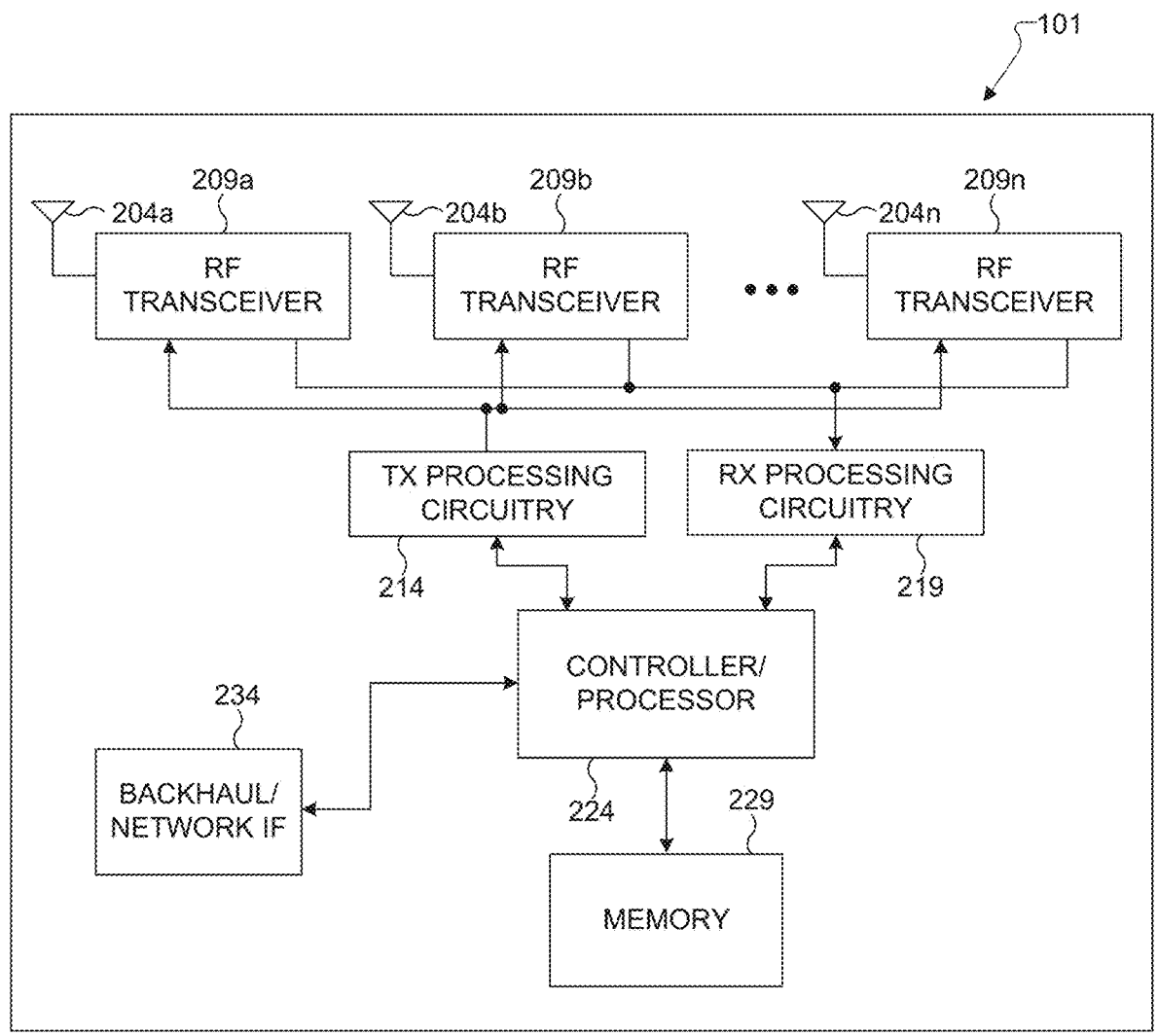
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204a-204n, multiple RF transceivers 209a-209n, transmit (TX) processing circuitry 214, and receive (RX) processing circuitry 219. The AP 101 also includes a controller/processor 224, a memory 229, and a backhaul or network interface 234. The RF transceivers 209a-209n receive, from the antennas 204a-204n, incoming RF signals, such as signals transmitted by STAs in the network 100. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including determining early termination of a restricted TWT SP for one or more scheduled STAs that are participating in the restricted TWT SP. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for determining early termination of a restricted TWT SP for one or more scheduled STAs that are participating in the restricted TWT SP. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
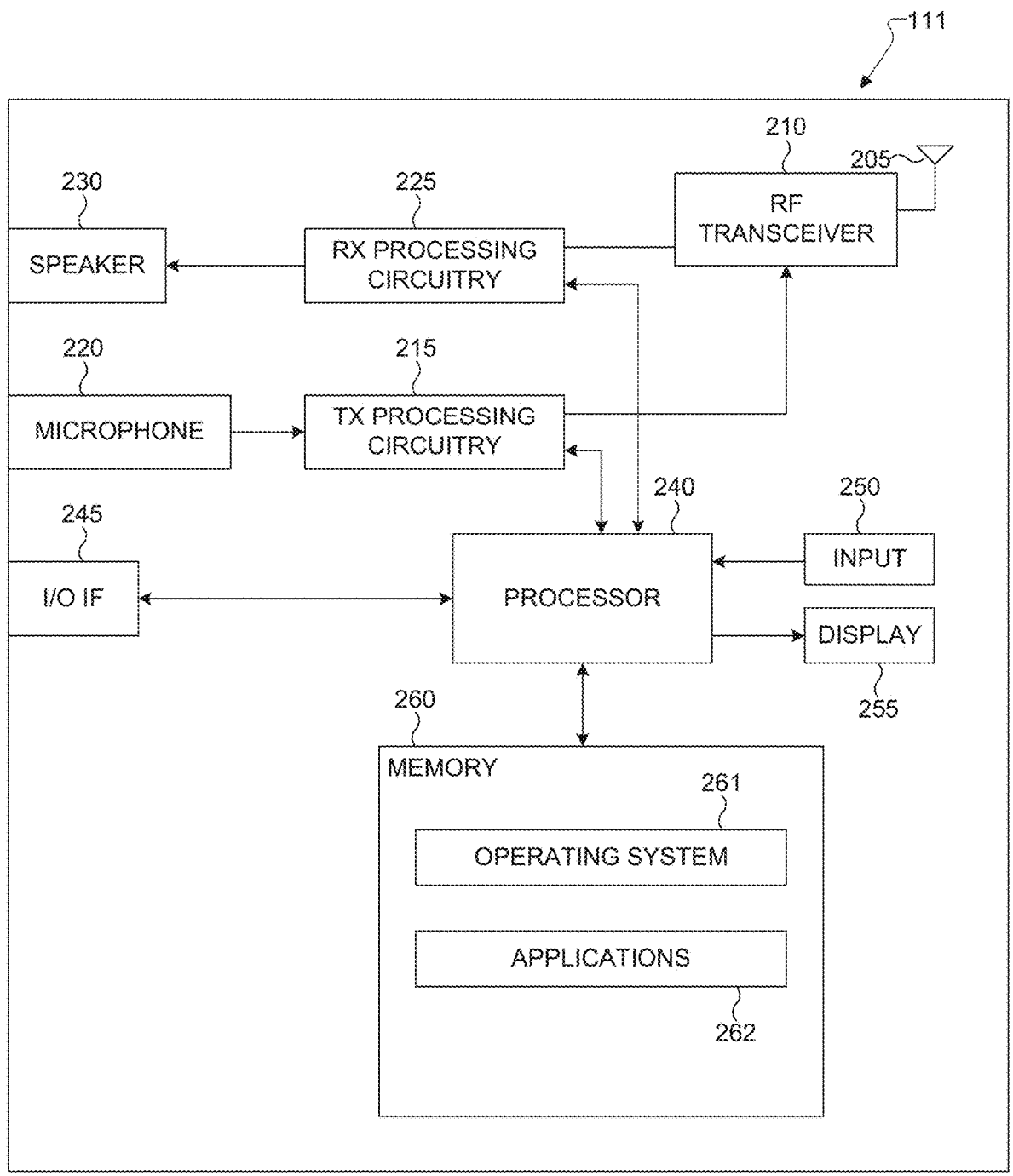
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. However, STAs come in a wide variety of configurations, and FIG. 2B does not limit the scope of this disclosure to any particular implementation of a STA.

The STA 111 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to receive an indication to terminate a restricted TWT SP and terminate the restricted TWT SP. In some embodiments, the controller/processor 240 includes at least one microprocessor or microcontroller.

The controller/processor 240 is also capable of executing other processes and programs resident in the memory 260, such as operations for receiving an indication to terminate a restricted TWT SP and terminating the restricted TWT SP. The controller/processor 240 can move data into or out of the memory 260 as required by an executing process. In some embodiments, the controller/processor 240 is configured to execute a plurality of applications 262, such as applications for receiving an indication to terminate a restricted TWT SP and terminating the restricted TWT SP. The controller/processor 240 can operate the plurality of applications 262 based on the OS program 261 or in response to a signal received from an AP. The main controller/processor 240 is also coupled to the I/O interface 245, which provides STA 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 111 can use the touchscreen 250 to enter data into the STA 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

Figure 3:
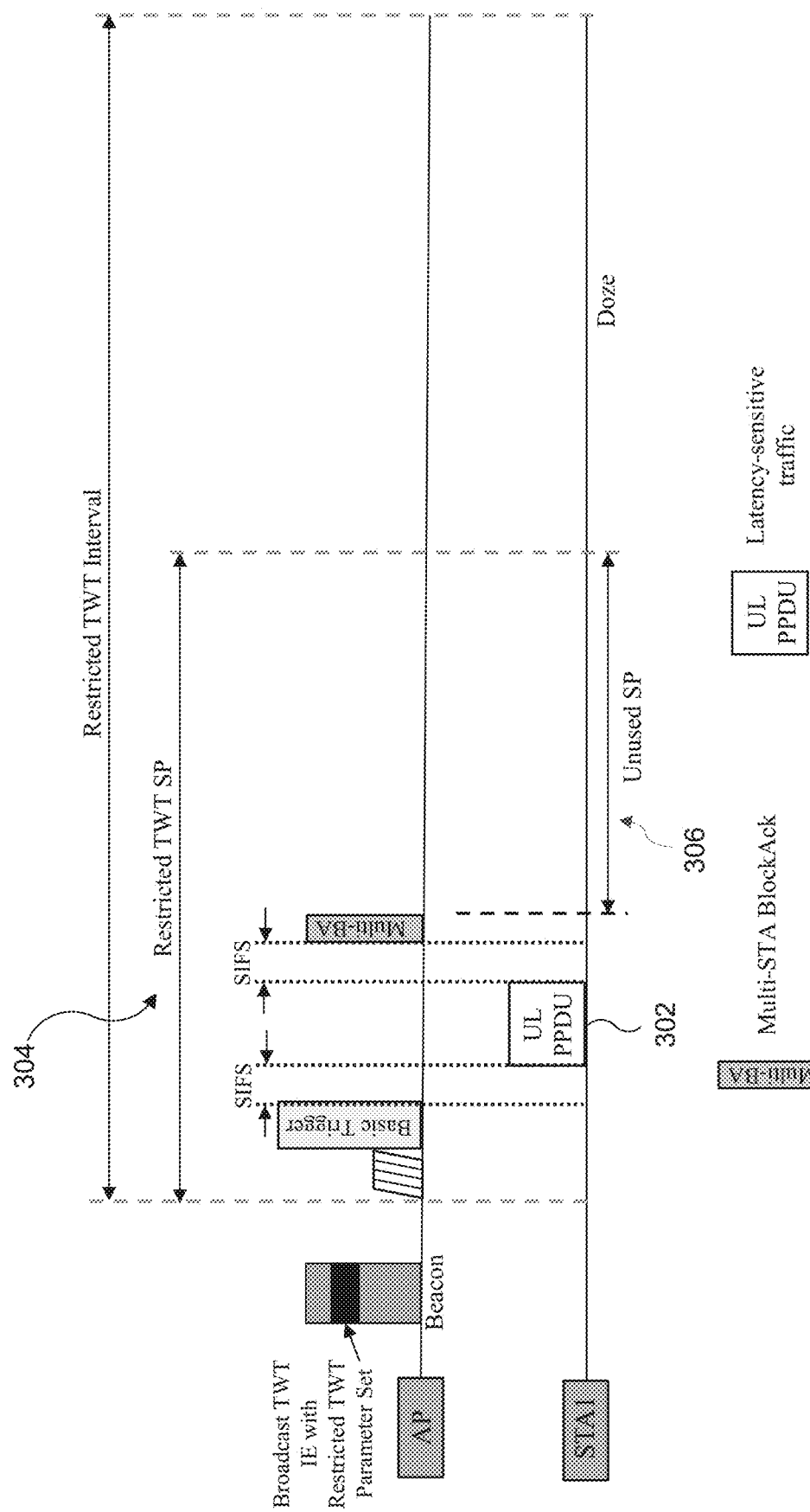
FIG. 3 illustrates an example of channel under-utilization during a restricted TWT SP according to embodiments of the present disclosure.

FIG. 3 illustrates an example of channel under-utilization during a restricted TWT SP according to various embodiments of the present disclosure. The example of FIG. 3 illustrates only a single scheduled STA for simplicity, but it is understood that multiple other scheduled STAs associated with the AP could be included in the traffic flow as well. Furthermore, the STAs discussed herein below could be any STA device, such as one of STAs 111-114 of FIG. 1, and the AP discussed herein below could be any AP device, such as one of APs 101 or 103 of FIG. 1.

As illustrated in FIG. 3, STA1 transmits a latency-sensitive UL physical layer protocol data unit (PPDU) 302 to the AP during the restricted TWT SP 304. After sending the UL PPDU 302, STA1 has no more latency-sensitive UL packets to transmit. Additionally, the AP has no DL latency-sensitive packets waiting for STA1. As a result, there is an unused portion 306 of restricted TWT SP 304 remaining if only latency-sensitive traffic is allowed during restricted TWT SPs.

Figure 4:
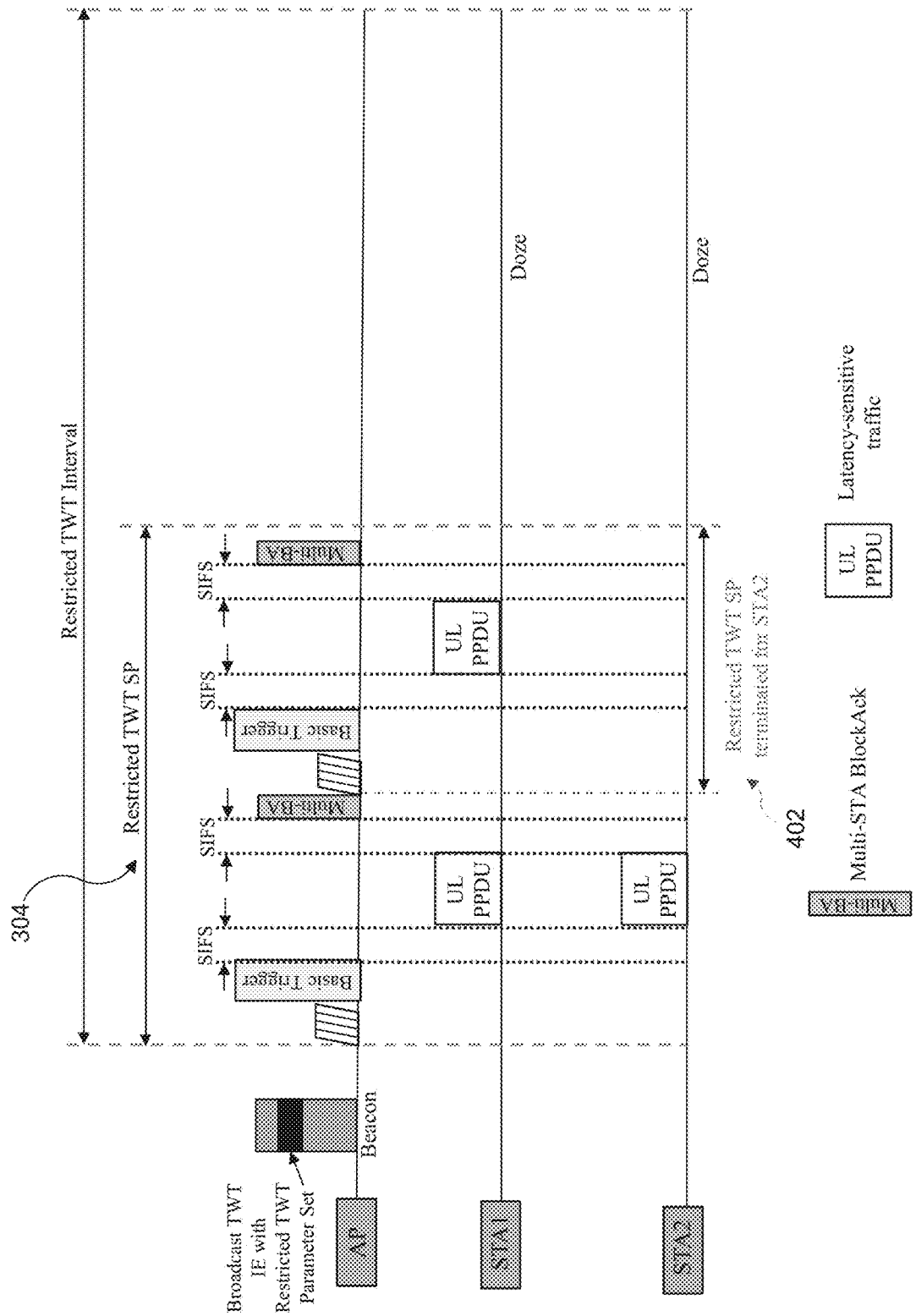
FIG. 4 illustrates an example process for fairly utilizing unused periods of a restricted TWT SP according to various embodiments of the present disclosure.

FIG. 4 illustrates an example process for fairly utilizing unused periods of a restricted TWT SP according to various embodiments of the present disclosure. FIG. 4 is illustrated as a modification of FIG. 3 with an additional scheduled STA associated with the AP (STA2) added to the traffic flow, but it is understood that any additional number of scheduled STAs associated with the AP could be included in the traffic flow as well.

As illustrated in FIG. 4, STA1 and STA2 are the members of the restricted TWT SP 304. The AP uses a basic Trigger frame to trigger uplink transmission from STA1 and STA2. Both STA1 and STA2 transmit UL PPDUs to the AP. At this point, STA1 has more latency sensitive traffic to transmit, however, STA2 has no more latency-sensitive traffic in its buffer. Additionally, the AP has no latency-sensitive traffic waiting for STA2. Therefore, STA2''s restricted TWT SP is terminated for the remaining period 402 of the SP in order to ensure better channel utilization for STA2 and to ensure fairness for STA1 during the remaining period 402 of the SP.

The present disclosure provides various embodiments for determining whether and when to terminate the restricted TWT SP for a STA in order to increase channel utilization while ensuring fairness. These embodiments may include rules that are followed by APs and STAs participating in restricted TWT operation.

In some embodiments, once a scheduled STA is done transmitting latency-sensitive traffic, and there is still time left in the restricted TWT SP, then the STA can report its buffer status to the scheduling AP. The buffer status can contain the queue sizes of all traffic identifiers (TIDs) corresponding to its latency-sensitive traffic. In one such embodiment, the scheduled STA can send a buffer status report (BSR) to the scheduling AP in order to specify its buffer status. The queue size for latency-sensitive TIDs contained in the BSR can indicate to the AP whether the STA's buffer for latency-sensitive traffic is empty. In another embodiment, the STA can transmit a signal that indicates that it has an empty buffer for latency-sensitive traffic.

If the AP receives a BSR from a scheduled STA indicating an empty buffer for latency-sensitive traffic, then the scheduling AP can terminate the restricted TWT SP for that particular scheduled STA if the AP didn't receive such an empty buffer indication from any other scheduled STA, and if the AP's downlink traffic buffer for latency sensitive traffic for that STA is also empty. In one such embodiment, to indicate the termination of the restricted TWT SP for a particular scheduled STA, the AP can transmit an individually addressed quality of service (QoS) Data or QoS Null frame with an end of service period (EOSP) subfield set to 1 (or equal to 1). In another such embodiment, the AP can send an individually addressed frame with a More Data field set to 0 to indicate the termination of the restricted TWT SP for a particular scheduled STA.

If the AP receives BSRs from all scheduled STAs that indicate empty buffers for latency-sensitive traffic, and if the AP's downlink buffers corresponding to latency sensitive traffic for all STAs are also empty, then the scheduling AP can terminate the restricted TWT SP for all scheduled STAs. In one such embodiment, to indicate the termination of the restricted TWT SP for all scheduled STAs, the AP can transmit a broadcast QoS Data or QoS Null frame with EOSP subfield equal to 1.

During a restricted TWT service period, if the scheduling AP detects that a scheduled STA is transmitting latency-tolerant traffic, then the scheduling AP can terminate the restricted TWT SP for that scheduled STA. In one such embodiment, to indicate the termination of the restricted TWT SP for that scheduled STA, the AP can transmit an individually addressed QoS Data or QoS Null frame with EOSP subfield equal to 1. In another such embodiment, the AP can send an individually addressed frame with a More Data field set to 0 to indicate the termination of the restricted TWT SP for that scheduled STA.

During the restricted TWT service period, if the scheduling AP detects that all scheduled STAs are transmitting latency-tolerant traffic, then the scheduling AP can terminate the restricted TWT SP for all scheduled STAs. In one such embodiment, to enable this termination, the AP can transmit a broadcast QoS Data or QoS Null frame with EOSP subfield equal to 1.

In various embodiments, if a Quiet interval for a restricted TWT SP is more than 1 time unit (TU), the AP can use a CF-End frame to terminate the Quiet interval (if needed) if the restricted TWT SP terminates earlier than the SP end time.

Figure 5:
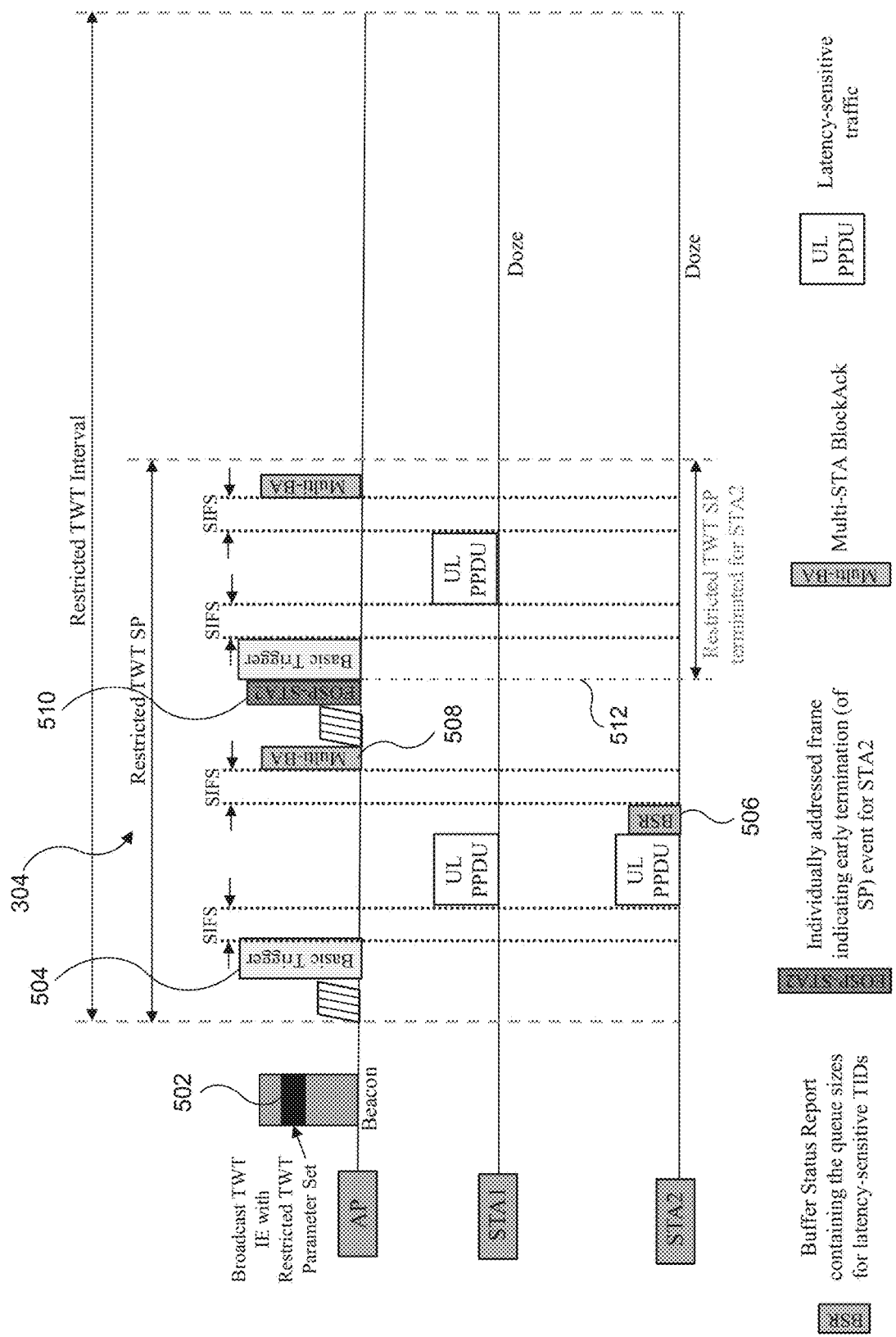
FIG. 5 illustrates an example process for early termination of a restricted TWT SP when a STA indicates that its latency-sensitive traffic buffer is empty according to various embodiments of the present disclosure.

FIG. 5 illustrates an example process for early termination of a restricted TWT SP when a STA indicates that its latency-sensitive traffic buffer is empty according to various embodiments of the present disclosure. FIG. 5 is a modification of the process of FIG. 4, but it is understood that the example of FIG. 5 could be extended to any appropriate scenario involving a restricted TWT SP.

As illustrated in FIG. 5, the AP transmits a broadcast TWT element 502 which includes a restricted TWT Parameter Set. STA1 and STA2 are members of the restricted TWT SP 304. At the beginning of the restricted TWT SP, the AP transmits a basic trigger frame 504 to both STAs.

After a SIFS period, STA1 and STA2 each transmit a latency-sensitive UL PPDU to the AP. Additionally, STA2 transmits a frame 506 containing a BSR indicating that its queue for latency-sensitive traffic is empty. The AP acknowledges the received UL PPDUs by sending a Multi-STA BlockAck 508.

In this example, there are no downlink packets waiting at the AP for STA2. As a result, the AP responds to the BSR received from STA2 by transmitting an individually addressed frame 510 to STA2 with EOSP field set to 1. This terminates the restricted TWT SP for STA2 at time 512.

Figure 6:
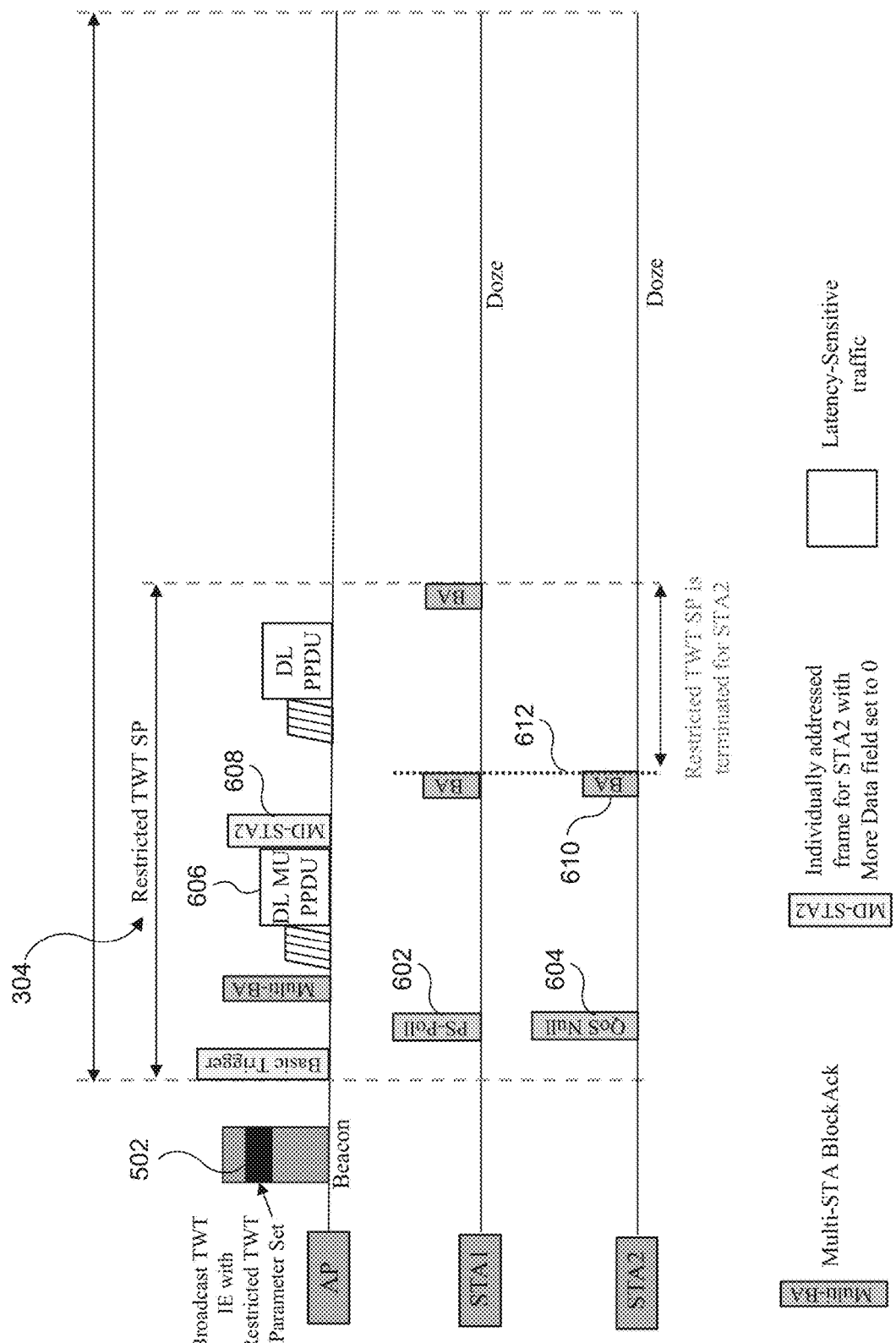

FIG. 6 illustrates an example process for early termination of a restricted TWT SP by an AP according to various embodiments of the present disclosure. It is understood that the example of FIG. 6 could be extended to any appropriate scenario involving a restricted TWT SP.

As illustrated in FIG. 6, the AP transmits a broadcast TWT element 502 which includes a restricted TWT Parameter Set. STA1 and STA2 are members of the restricted TWT SP 304. At the beginning of the restricted TWT SP, the AP transmits a basic trigger frame to both STAs.

STA1 responds to the trigger frame by transmitting a PS-Poll frame 602 to the AP. STA2 responds to the trigger frame by transmitting a QoS-Null frame 604 to the AP. After transmitting a Multi-STA BlockAck, the AP transmits downlink multi-user (MU) PPDU 606 to the STAs. Additionally, the AP transmits an individually addressed frame 608 to STA2 with More Data field set to 0. Upon reception of this individually addressed frame, STA2 transmits a BlockAck 610 to the AP, and STA2''s restricted TWT SP is then terminated at time 612.

In various embodiments of the present disclosure, a restricted TWT scheduled STA that is a member of a restricted TWT schedule can send explicit signaling to the corresponding restricted TWT scheduling AP indicating that the restricted TWT scheduled STA is done with transmitting UL traffic for a restricted TWT SP. This signaling indicates to the restricted TWT scheduling AP that the restricted TWT scheduled STA is ready for the termination of the corresponding restricted TWT SP. If the restricted TWT scheduling AP is also done with transmitting downlink traffic for that restricted TWT scheduled STA for that restricted TWT SP, then the restricted TWT scheduling AP can terminate the restricted TWT SP for that restricted TWT scheduled STA.

According to one such embodiment, the restricted TWT scheduled STA can send a TWT SP Termination Ready frame to make such signaling to the restricted TWT scheduling AP. An example format of the TWT SP Termination Ready frame is shown in Table 1. Other formats to indicate such signaling are also possible.

TABLE 1

| Order | Information |
|---|---|
| 1 | Category |
| 2 | Unprotected S1G Action |
| 3 | TWT Flow |

An example of definitions of the Unprotected S1G Action field of the TWT SP Termination Ready frame is shown in Table 2.

TABLE 2

| Value | Meaning | Time Priority |
|---|---|---|
| 0 | AID Switch Request | No |
| 1 | AID Switch Response | No |
| 2 | Sync Control | No |
| 3 | STA Information Announcement | No |
| 4 | EDCA Parameter Set | No |
| 5 | EL Operation | No |
| 6 | TWT Setup | No |
| 7 | TWT Teardown | No |
| 8 | Sectorized Group ID List | No |
| 9 | Sector ID Feedback | No |
| 10 | Reserved | |
| 11 | TWT Information | No |
| 12 | TWT SP Termination Ready | No |
| 13-255 | Reserved | |

In Table 2, other values from 13 to 255 can also be used to indicate the TWT SP Termination Ready frame.

Figure 7A:
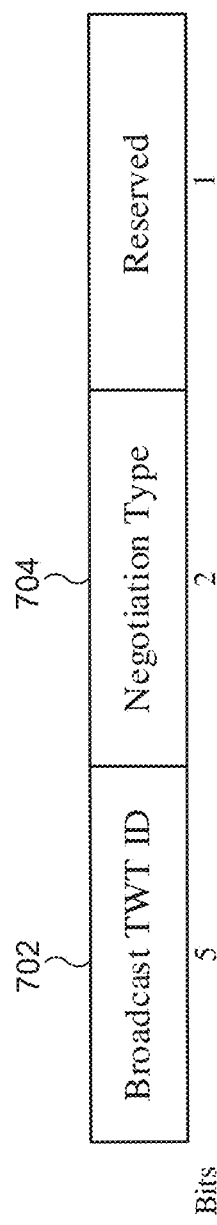
FIGS. 7A-7B illustrate example formats of a TWT Flow field of a TWT SP Termination Ready frame or element according to various embodiments of the present disclosure.

FIG. 7A illustrates an example format of a TWT Flow field of a TWT SP Termination Ready frame according to various embodiments of the present disclosure. The Broadcast TWT ID field 702 in the TWT SP Termination Ready frame is the Broadcast TWT ID corresponding to the SP for which the STA is ready for termination of a restricted TWT SP. The Negotiation Type subfield 704 can be the same as that defined for TWT operation in the current IEEE 802.11 specification.

According to another embodiment, the restricted TWT scheduled STA can include a TWT SP Termination Ready element in any frame that the STA transmits to the restricted TWT scheduling AP as an indication that the STA is ready for termination of the corresponding restricted TWT SP. The format of the TWT SP Termination Ready element may be the same as the format of the TWT Flow field of a TWT SP Termination Ready frame illustrated in FIG. 7A. Other formats are also possible for this element.

In some embodiments, if a restricted TWT scheduled STA sends a TWT SP Termination Ready frame or TWT SP Termination Ready element during a restricted TWT SP, it indicates that the STA is ready for termination of that restricted TWT SP. In other embodiments, it indicates that the STA is ready for termination of subsequent SPs as well. The STA may indicate in the TWT SP Termination Ready frame or TWT SP Termination Ready element a specified number of subsequent restricted TWT SPs to terminate.

In some embodiments, if a restricted TWT scheduled STA sends a TWT SP Termination Ready frame or TWT SP Termination Ready element outside of a restricted TWT SP, it indicates that the STA is ready for termination of the next restricted TWT SP. In other embodiments, it indicates that the STA is ready for termination of subsequent SPs starting from the next restricted TWT SP. The STA may indicate in the TWT SP Termination Ready frame or TWT SP Termination Ready element a specified number of subsequent restricted TWT SPs to terminate.

According to various embodiments, a TWT SP Termination Ready frame or TWT SP Termination Ready element formatted as shown in FIG. 7A may not contain a Negotiation Type subfield 704.

In some embodiments, a restricted TWT scheduling AP can transmit a TWT SP Termination Ready frame or TWT SP Termination Ready element to the restricted TWT scheduled STA to indicate that the AP is done transmitting latency-sensitive downlink traffic for that restricted TWT scheduled STA and that the AP is ready for termination of a restricted TWT SP if the corresponding restricted TWT scheduled STA is also done transmitting latency-sensitive uplink traffic for that restricted TWT SP. The AP may also indicate a specified number of subsequent restricted TWT SPs that are terminated. Accordingly, the above-mentioned embodiments similarly apply from the point of view of the AP.

The SP termination ready signaling disclosed above can be applicable for individual TWT or for broadcast TWT operation. For individual TWT operation, the Broadcast TWT ID field 702 in the TWT SP Termination Ready frame or TWT SP Termination Ready element can be replaced by a TWT Flow Identifier of the corresponding individual TWT agreement.

According to one embodiment, when a restricted TWT scheduling AP or a restricted TWT scheduled STA sends the TWT SP Termination Ready frame or TWT SP Termination Ready element to a restricted TWT scheduled STA or a restricted TWT scheduling AP, respectively, it can be interpreted as one of the following:

The STA transmitting the TWT SP Termination Ready frame or TWT SP Termination Ready element is ready for termination of the restricted TWT SP, The STA transmitting the frame or element is ready for termination of the restricted TWT SP if the recipient STA is also ready for termination of the corresponding restricted TWT SP, The STA transmitting the frame or element is ready for termination of the restricted TWT SP if the recipient STA does not have any frame corresponding to the TIDs that are negotiated during the restricted TWT setup phase for the STA that transmits the TWT SP Termination Ready frame or TWT SP Termination Ready element, The STA transmitting the frame or element is requesting the recipient STA to terminate the restricted TWT SP, The STA transmitting the frame or element is requesting the recipient STA to terminate the restricted TWT SP including the current restricted TWT SP as well as other subsequent restricted TWT SPs, The STA transmitting the frame or element is requesting the recipient STA to terminate the subsequent restricted TWT SPs excluding the current restricted TWT SP within which the frame or element is received, The STA transmitting the frame or element is notifying the recipient STA that the transmitting STA is going to terminate the restricted TWT SP, The STA transmitting the frame or element is notifying the recipient STA that the transmitting STA is going to terminate the restricted TWT SP at a particular time. The corresponding timing information for restricted TWT SP termination can be included in the corresponding TWT SP Termination Ready frame or TWT SP Termination Ready element, for example using a field called restricted TWT SP termination time, or The STA transmitting the frame or element notifying the recipient STA that the transmitting STA is going to terminate the restricted TWT SP once the transmitting STA receives some indication from the receiving STA that the receiving STA is done with transmitting latency-sensitive traffic for the transmitting STA (for example, one such indication can be buffer status at the receiving STA side that indicates that the receiving STA has empty buffer corresponding to the TIDs that are latency sensitive, i.e., that are negotiated during the restricted TWT setup phase).

According to one embodiment, an encoding in a control field in the TWT SP Termination Ready frame or TWT SP Termination Ready element can indicate one of the above options to be used to interpret the TWT SP Termination Ready frame or TWT SP Termination Ready element upon its receipt. Such a control field can be termed, for example, a restricted TWT SP Termination Control field.

Figure 7B:
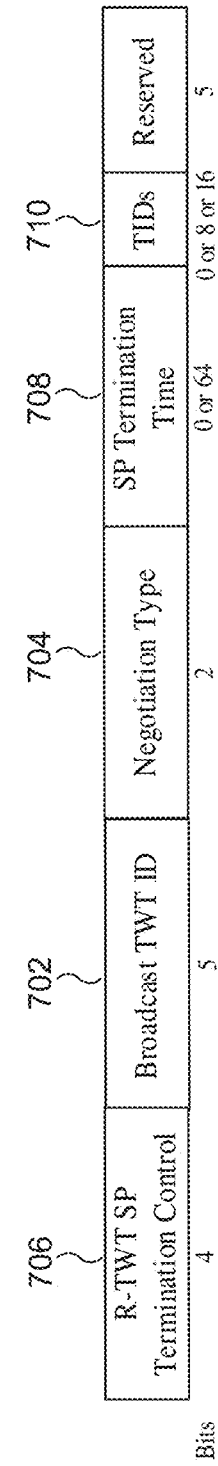

FIG. 7B illustrates another example format of the TWT SP Termination Ready element (or that of TWT Flow field of the TWT SP Termination Ready frame) according to various embodiments of the present disclosure.

As illustrated in FIG. 7B, the restricted TWT SP Termination Control field 706 contains an encoding to indicate how to interpret the corresponding frame upon reception, as discussed above. The SP Termination Time field 708 indicates the time at which the SP termination event is planned to occur. The TIDs subfield 710 indicates the set of TIDs for which there is no corresponding traffic available at the transmitter side for the receiver side.

According to some embodiments, for a restricted TWT schedule suspension or resumption, a restricted TWT scheduled STA or a restricted TWT scheduling AP can use a restricted TWT Information field. The format and operation of the restricted TWT Information field may be the same as that of the TWT Information field except that the restricted TWT Information field is applicable for restricted TWT schedules and may not apply to other broadcast TWT schedules.

In some embodiments, if suspending or resuming broadcast TWT schedules using an All TWT subfield set to 1 in the TWT Information field, this does not cause the suspension or resumption of restricted TWT schedules that the restricted TWT scheduling may have. Rather, this will suspend or resume broadcast TWT schedules that are not restricted TWT schedules.

Figure 8:
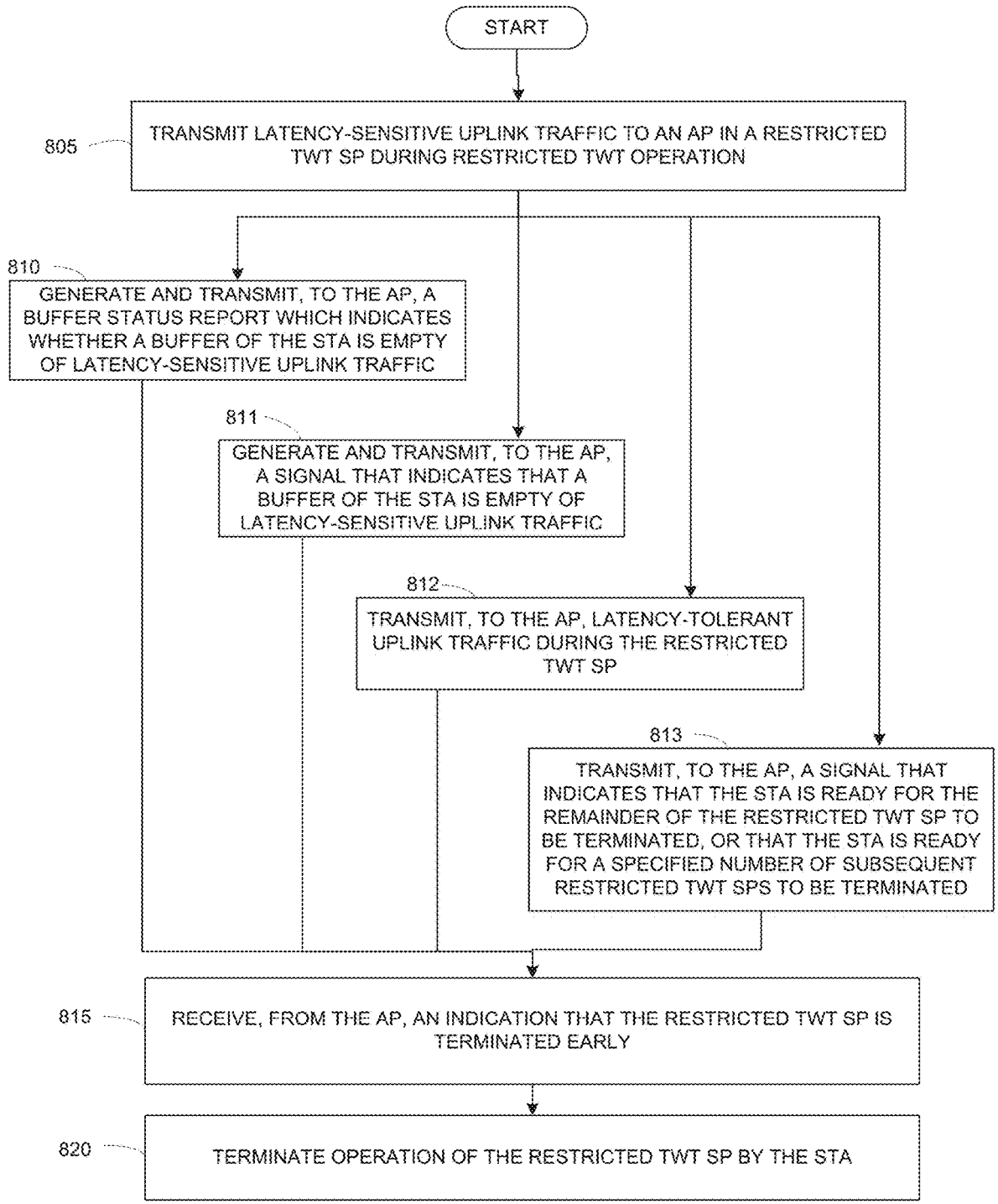
FIG. 8 illustrates example process for early termination of a restricted TWT SP during restricted TWT operation by a wireless STA device according to various embodiments of the present disclosure.

FIG. 8 illustrates an example process for early termination of a restricted TWT SP during restricted TWT operation by a wireless STA device according to various embodiments of the present disclosure. The process of FIG. 8 is discussed as being performed by a STA, but it is understood that an AP could perform a corresponding process to determine to terminate the restricted TWT SP. Additionally, for convenience, the process of FIG. 8 is discussed as being performed by a WI-FI STA, but it is understood that any suitable wireless communication device could perform these processes.

Beginning at step 805, the STA transmits latency-sensitive uplink traffic to an AP in a restricted TWT SP during restricted TWT operation. In some embodiments, the latency-sensitive uplink traffic for transmission during the restricted TWT SP is stored in a buffer of the STA.

In some embodiments, the STA next generates and transmits, to the AP, a buffer status report which indicates whether a buffer of the STA is empty of latency-sensitive uplink traffic (step 810). The buffer status report contains a queue size of all TIDs corresponding to the latency-sensitive uplink traffic.

In alternative embodiments, after step 805 the STA generates and transmits, to the AP, a signal that indicates that the buffer is empty of latency-sensitive uplink traffic (step 811). This signal may be a QoS Null frame.

The STA then receives, from the AP, an indication that the restricted TWT SP is terminated early (step 815). This may be based on a lack of latency-sensitive uplink traffic for transmission by the STA and a lack of latency-sensitive downlink traffic for reception by the STA in a remainder of the restricted TWT SP.

The STA next terminates operation of the restricted TWT SP (step 820).

In some embodiments, the indication of step 815 may indicate that the restricted TWT SP is terminated early for the individual STA, based on the AP having received the buffer status report of step 810 that indicates that the buffer is empty of the latency-sensitive uplink traffic, and based on the AP not having received another buffer status report from another STA that indicates that a buffer for latency-sensitive uplink traffic of the other STA is empty.

In other embodiments, the indication of step 815 may indicate that the restricted TWT SP is terminated early for all of a plurality of STAs that includes the STA and other STAs, based on the AP having received the buffer status report of step 810 that indicates that the buffer is empty of the latency-sensitive uplink traffic, and based on the AP having received other buffer status reports from each of the other STAs that indicate that respective buffers for latency-sensitive uplink traffic of each of the other STAs are empty.

In yet other embodiments, the indication of step 815 may indicate that the restricted TWT SP is terminated early for the individual STA, based on the AP having received the signal of step 811 that indicates that the buffer is empty of latency-sensitive uplink traffic.

Returning to step 805, the STA may next transmit, to the AP, latency-tolerant uplink traffic during the restricted TWT SP (step 812). For example, the STA may have no more latency-intolerant uplink traffic in its buffer but may take advantage of the remainder of the restricted TWT SP to transmit latency-tolerant traffic.

In one embodiment, after step 812 the indication of step 815 may indicate that the restricted TWT SP is terminated early for the individual STA based on the AP having detected the transmission, by the STA, of the latency-tolerant uplink traffic during the restricted TWT SP.

In another embodiment, after step 812 the indication of step 815 may indicate that the restricted TWT SP is terminated early for all of a plurality of STAs that includes the STA and other STAs, based on the AP having detected the transmission by the STA of the latency-tolerant uplink traffic during the restricted TWT SP and the AP having detected transmissions by each of the other STAs of other latency-tolerant uplink traffic during the restricted TWT SP.

Returning to step 805, the STA may next transmit, to the AP, a signal that indicates either that the STA is ready for the remainder of the restricted TWT SP to be terminated, or that the STA is ready for a first specified number of subsequent restricted TWT SPs to be terminated (step 813). The first specified number may be indicated by the STA in the signal.

After step 813, the indication of step 815 may be a second signal that indicates that the remainder of the restricted TWT SP is terminated by the AP, or that a second specified number of subsequent restricted TWT SPs is to be terminated. The second specified number may be indicated by the AP in the second signal and may correspond to the first number indicated by the STA at step 813.

The above flowchart illustrates example methods that can be implemented in accordance with the principles of the present disclosure and various changes could be made to the methods illustrated in the flowchart. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A wireless station (STA) device comprising:
a transceiver configured to:
transmit latency-sensitive uplink traffic and receive latency-sensitive downlink traffic in a restricted target wake time (TWT) service period (SP) during restricted TWT operation;
transmit, to an access point (AP), a first signal that indicates either that the STA is ready for a remainder of the restricted TWT SP to be terminated, or that the STA is ready for a first specified number of subsequent restricted TWT SPs to be terminated, the first specified number indicated by the STA in the first signal; and
receive, from the AP, a second signal including an indication that the restricted TWT SP is terminated early for the STA based on a lack of the latency-sensitive uplink traffic for transmission by the STA and a lack of the latency-sensitive downlink traffic for reception by the STA in the remainder of the restricted TWT SP, wherein the second signal indicates that the remainder of the restricted TWT SP is terminated by the AP, or that a second specified number of subsequent restricted TWT SPs is to be terminated by the AP, the second specified number indicated by the AP in the second signal; and
a processor operably coupled to the transceiver, the processor configured to terminate operation of the restricted TWT SP.

2. The STA of claim 1, further comprising a buffer that is configured to store the latency-sensitive uplink traffic, wherein:
the transceiver is further configured to transmit, to the AP, the latency-sensitive uplink traffic in the buffer during the restricted TWT SP;
the processor is further configured to, after transmission of all of the latency-sensitive uplink traffic in the buffer, generate a buffer status report containing a queue size of all traffic identifiers (TIDs) corresponding to the latency-sensitive uplink traffic which indicates whether the buffer is empty of the latency-sensitive uplink traffic; and
the transceiver is further configured to transmit, to the AP, the buffer status report.

3. The STA of claim 2, wherein the transceiver is further configured to:
after transmission of the buffer status report, receive, from the AP, the indication that the restricted TWT SP is terminated early for the STA, based on:
(i) the AP having received the buffer status report that indicates that the buffer is empty of the latency-sensitive uplink traffic; and
(ii) the AP not having received another buffer status report from another STA that indicates that a buffer for the latency-sensitive uplink traffic of the other STA is empty.

4. The STA of claim 2, wherein the transceiver is further configured to:
after transmission of the buffer status report, receive, from the AP, the indication that the restricted TWT SP is terminated early for all of a plurality of STAs that includes the STA and other STAs, based on:
(i) the AP having received the buffer status report that indicates that the buffer is empty of the latency-sensitive uplink traffic; and
(ii) the AP having received other buffer status reports from each of the other STAs that indicate that respective buffers for the latency-sensitive uplink traffic of each of the other STAs are empty.

5. The STA of claim 1, further comprising a buffer that is configured to store the latency-sensitive uplink traffic, wherein:
the transceiver is further configured to transmit, to the AP, the latency-sensitive uplink traffic in the buffer during the restricted TWT SP;
the processor is further configured to, after transmission of all of the latency-sensitive uplink traffic in the buffer, generate a signal that indicates that the buffer is empty of the latency-sensitive uplink traffic; and
the transceiver is further configured to transmit, to the AP, the signal.

6. The STA of claim 1, wherein the transceiver is further configured to:
transmit, to the AP, latency-tolerant uplink traffic during the restricted TWT SP; and
receive, from the AP, the indication that the restricted TWT SP is terminated early for the STA based on the AP having detected the transmission, by the STA, of the latency-tolerant uplink traffic during the restricted TWT SP.

7. The STA of claim 1, wherein the transceiver is further configured to:

transmit, to the AP, latency-tolerant uplink traffic during the restricted TWT SP; and receive, from the AP, the indication that the restricted TWT SP is terminated early for all of a plurality of STAs that includes the STA and other STAs, based on the AP having detected the transmission by the STA of the latency-tolerant uplink traffic during the restricted TWT SP and the AP having detected transmissions by each of the other STAs of other latency-tolerant uplink traffic during the restricted TWT SP.

8. A wireless access point (AP) device comprising:

a transceiver configured to:
- transmit latency-sensitive downlink traffic and receive latency-sensitive uplink traffic in a restricted target wake time (TWT) service period (SP) during restricted TWT operation;
- receive, from a station (STA), a first signal that indicates either that the STA is ready for a remainder of the restricted TWT SP to be terminated, or that the STA is ready for a first specified number of subsequent restricted TWT SPs to be terminated, the first specified number indicated by the STA in the first signal; and
- transmit, to the STA, a second signal including an indication that the restricted TWT SP is terminated early for the STA based on a lack of the latency-sensitive uplink traffic for transmission by the STA and a lack of the latency-sensitive downlink traffic for reception by the STA in the remainder of the restricted TWT SP, wherein the second signal indicates that the remainder of the restricted TWT SP is terminated by the AP, or that a second specified number of subsequent restricted TWT SPs is to be terminated by the AP, the second specified number indicated by the AP in the second signal; and a processor operably coupled to the transceiver, the processor configured to terminate operation of the restricted TWT SP with respect to the STA.

9. The AP of claim 8, wherein the transceiver is further configured to:
receive, from the STA, the latency-sensitive uplink traffic, which is stored in a buffer of the STA, during the restricted TWT SP; and
after reception of the latency-sensitive uplink traffic, receive, from the STA, a buffer status report that contains a queue size of all traffic identifiers (TIDs) corresponding to the latency-sensitive uplink traffic which indicates whether the buffer is empty of the latency-sensitive uplink traffic.

10. The AP of claim 9, wherein:
the processor is further configured to generate, after reception of the buffer status report, the indication that the restricted TWT SP is terminated early for the STA, based on:
(i) the AP having received the buffer status report that indicates that the buffer is empty of the latency-sensitive uplink traffic; and
(ii) the AP not having received another buffer status report from another STA that indicates that a buffer for latency-sensitive uplink traffic of the other STA is empty; and
the transceiver is further configured to transmit, to the STA, the indication that the restricted TWT SP is terminated early for the STA.

11. The AP of claim 9, wherein:
the processor is further configured to generate, after reception of the buffer status report, the indication that the restricted TWT SP is terminated early for all of a plurality of STAs that includes the STA and other STAs, based on:
(i) the AP having received the buffer status report that indicates that the buffer is empty of the latency-sensitive uplink traffic; and
(ii) the AP not having received another buffer status report from another STA that indicates that a buffer for the latency-sensitive uplink traffic of the other STA is empty; and
the transceiver is further configured to transmit, to the STA, the indication that the restricted TWT SP is terminated early for all of the plurality of STAs.

12. The AP of claim 8, wherein the transceiver is further configured to:
receive, from the STA, the latency-sensitive uplink traffic, which is stored in a buffer of the STA, during the restricted TWT SP; and
after reception of the latency-sensitive uplink traffic, receive, from the STA, a signal that indicates that the buffer is empty of the latency-sensitive uplink traffic.

13. The AP of claim 8, wherein:
the transceiver is further configured to receive, from the STA, latency-tolerant uplink traffic during the restricted TWT SP;
the processor is further configured to:
detect the transmission, from the STA, of the latency-tolerant uplink traffic during the restricted TWT SP; and
based on the detection of the transmission, from the STA, of the latency-tolerant uplink traffic during the restricted TWT SP, generate an indication that the restricted TWT SP is terminated early for the STA; and
the transceiver is further configured to transmit, to the STA, the indication that the restricted TWT SP is terminated early for the STA.

14. The AP of claim 8, wherein:
the transceiver is further configured to receive, from each of a plurality of STAs that includes the STA and other STAs, latency-tolerant uplink traffic during the restricted TWT SP;
the processor is further configured to:
detect the transmission, from each of the plurality of STAs, of the latency-tolerant uplink traffic during the restricted TWT SP; and
based on the detection of the transmission, from each of the plurality of STAs, of the latency-tolerant uplink traffic during the restricted TWT SP, generate an indication that the restricted TWT SP is terminated early for all of the plurality of STAs; and
the transceiver is further configured to transmit, to the plurality of STAs, the indication that the restricted TWT SP is terminated early for all of the plurality of STAs.

15. A method of early termination of a restricted target wake time (TWT) service period (SP) during restricted TWT operation by a wireless station (STA) device, the method comprising:
transmitting, to an access point (AP), latency-sensitive uplink traffic in the restricted TWT SP;
transmitting, to the AP, a first signal that indicates either that the STA is ready for a remainder of the restricted TWT SP to be terminated, or that the STA is ready for a first specified number of subsequent restricted TWT SPs to be terminated, the first specified number indicated by the STA in the first signal;

receiving, from the AP, a second signal including an indication that the restricted TWT SP is terminated early for the STA based on a lack of the latency-sensitive uplink traffic for transmission by the STA and a lack of the latency-sensitive downlink traffic for reception by the STA in the remainder of the restricted TWT SP, wherein the second signal indicates that the remainder of the restricted TWT SP is terminated by the AP, or that a second specified number of subsequent restricted TWT SPs is to be terminated by the AP, the second specified number indicated by the AP in the second signal; and terminating operation of the restricted TWT SP.

16. The method of claim 15, further comprising:
transmitting, to the AP, the latency-sensitive uplink traffic, which is stored in a buffer of the STA, during the restricted TWT SP;
after transmission of all of the latency-sensitive uplink traffic in the buffer, generating a buffer status report containing a queue size of all traffic identifiers (TIDs) corresponding to the latency-sensitive uplink traffic which indicates whether the buffer is empty of the latency-sensitive uplink traffic; and
transmitting, to the AP, the buffer status report.

17. The method of claim 16, further comprising:
after transmission of the buffer status report, receiving, from the AP, the indication that the restricted TWT SP is terminated early for the STA, based on:
(i) the AP having received the buffer status report that indicates that the buffer is empty of the latency-sensitive uplink traffic; and
(ii) the AP not having received another buffer status report from another STA that indicates that a buffer for the latency-sensitive uplink traffic of the other STA is empty.

18. The method of claim 15, further comprising:
transmitting, to the AP, the latency-sensitive uplink traffic, which is stored in a buffer of the STA, during the restricted TWT SP;
after transmission of all of the latency-sensitive uplink traffic in the buffer, generating a signal that indicates that the buffer is empty of the latency-sensitive uplink traffic; and
transmitting, to the AP, the signal.

19. The method of claim 15, further comprising:
transmitting, to the AP, latency-tolerant uplink traffic during the restricted TWT SP;
wherein receiving, from the AP, an indication that the restricted TWT SP is terminated early for the STA further comprises receiving, from the AP, the indication that the restricted TWT SP is terminated early for the STA based on the AP having detected the transmission, by the STA, of the latency-tolerant uplink traffic during the restricted TWT SP.

20. The method of claim 15, further comprising:
transmitting, to the AP, latency-tolerant uplink traffic during the restricted TWT SP; and
wherein receiving, from the AP, an indication that the restricted TWT SP is terminated early for the STA further comprises receiving, from the AP, the indication that the restricted TWT SP is terminated early for all of a plurality of STAs that includes the STA and other STAs, based on the AP having detected the transmission by the STA of the latency-tolerant uplink traffic during the restricted TWT SP and the AP having detected transmissions by each of the other STAs of other latency-tolerant uplink traffic during the restricted TWT SP.

* * * * *